United States Patent Office 3,667,766
Patented June 6, 1972

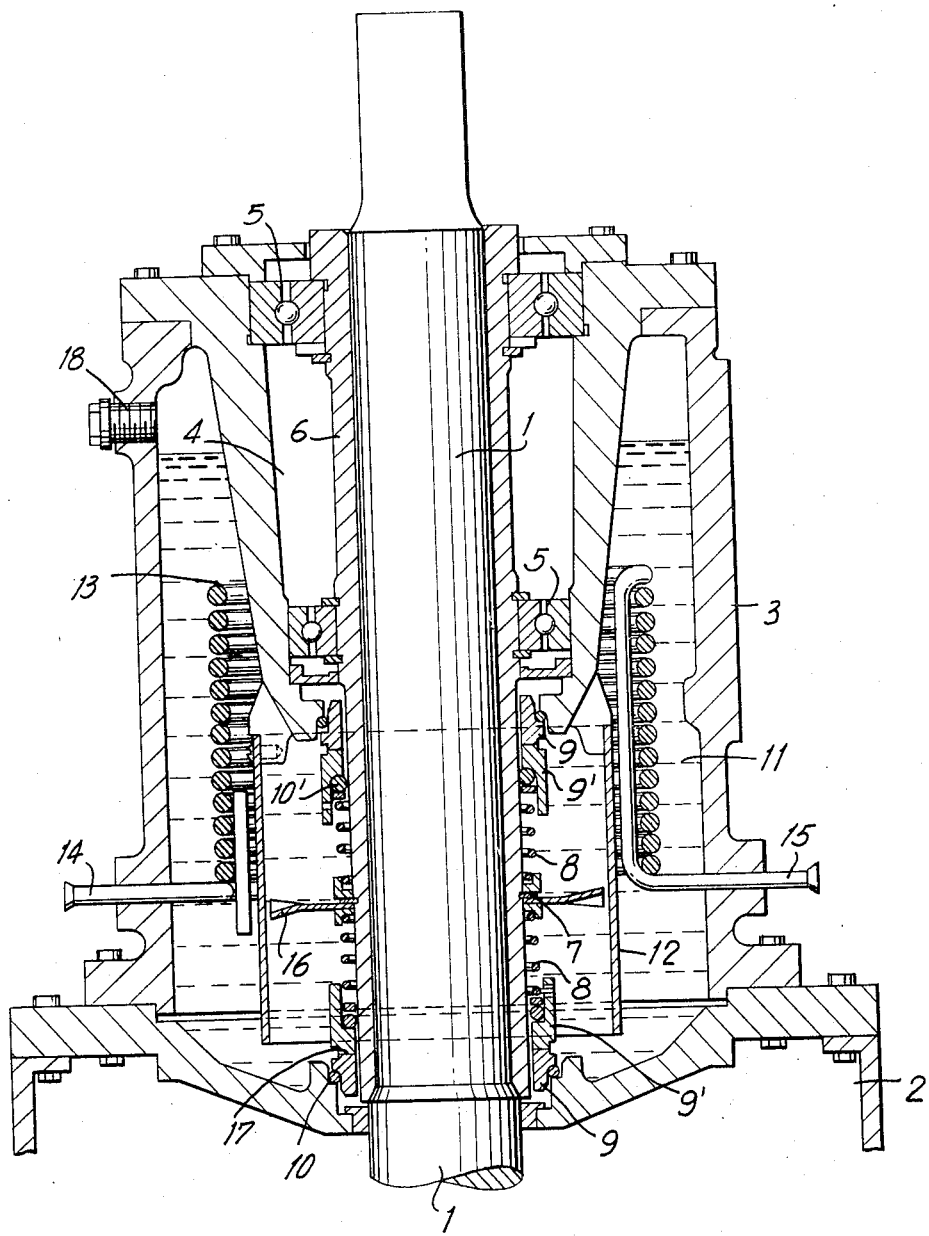

3,667,766
SEALING AND GUIDING DEVICE FOR A SHAFT DRIVEN IN ROTATION
Louis Sussmeyer, Rue de Birmingham 222, 1070 Brussels, Belgium
Filed May 28, 1970, Ser. No. 41,314
Claims priority, application Belgium, Mar. 20, 1970, 86,755
Int. Cl. F16j *15/40;* F02f *11/00*
U.S. Cl. 277—22                    3 Claims

ABSTRACT OF THE DISCLOSURE

A sealing and guiding device is provided for a shaft driven in rotation and intended to operate in an enclosure under a pressure different from normal atmospheric pressure. The device comprises seals of rigid material arranged to ensure the seal-tightness of the shaft in a container which is contiguous to the working enclosure. The container is filled with a lubricant which is cooled by passing a cooling agent through a coil in the container. The container is pressurized to a value similar to that prevailing in the enclosure. The shaft is supported and guided in guide bearings arranged in a clearance between an indented portion of the container and the shaft.

---

The present invention relates to a sealing and guiding device for a shaft driven in rotation intended to operate in an enclosure under a pressure different from normal atmospheric presssure.

Appliances are known, for example, which make it possible to disperse, by stirring, solids such as pigments into liquid media isolated from atmospheric air and in the presence of a grinding agent, such as gauged sand, so as to form, after sieving the sand under pressure, suspensions which are thick, stable and free from air bubbles. The stirring device of those appliances is ordinarily driven by a rotating shaft suspended in a closed cylindrical working enclosure. The lower end of the shaft must be stabilized against vibrations or radial bending, while the upper end must be connected in a seal-tight manner to an engine. However, this tightness is difficult to achieve, and there is always a danger that wear will occur because of the constant friction between the shaft and the grinding agent.

The sealing and guiding device in accordance with the invention obviates these drawbacks and prevents leakage of volatile or toxic products. For this purpose, it comprises on the one hand seals of rigid material arranged so as to ensure the seal-tightness of the shaft in both directions and enclosed in a container which is contiguous to the working enclosure, filled with a lubricant exposed to a cooling agent passing through the container and connected with means able to maintain in the container a pressure similar to that prevailing in the working enclosure. It comprises, furthermore, guide bearings mounted between the container and shaft on a support in an indented portion of the container. It may also have advantageously blades which are fixed on the shaft.

The sole figure of the attached drawing shows in cross-section one embodiment of the invention.

A shaft 1 driven in rotation and intended to operate in an enclosure 2 which may be under a pressure different from normal atmospheric pressure, passes through a container 3 with sealing means, and a support 4 in which guide bearings 5 are located. The shaft is driven in rotation by an engine which has not been shown. In the container 3 and the support 4, the shaft is of uniform outer diameter and is covered with a protecting sheath 6. The guide bearings 5 are arranged at both ends of the support 4 and are disposed in a clearance between the sheath and the container, said clearance being formed by an indented portion of the container as shown in the drawing. The bearings 5 effect the guiding and the perfect aligning of the shaft.

In container 3, the sheath is provided with a boss 7 on which there are mounted in opposition, through springs 8, two sets of sealing rings 9 and 9' of rigid material such as a metal or a metal compound with a non-metallic element and two sets of O-rings 10 and 10' of flexible material such as rubber. The rings 9 with the fixed O-rings 10 are integral with the support 4 and with the bottom of the container respectively, and ensure the tightness thereof. The rings 9' with the O-rings 10' rotate with the shaft and ensure its seal-tightness in both directions.

Container 3 contains a lubricant 11, a cylindrical screen 12, a coil 13 through which, between the manifolds 14 and 15, a cold liquid such as water flows, and blades 16 secured to the sheath of the shaft. The lubricant 11 is moved in circulation by the blades 16 in the area delimited by the screen 12 and absorbs the heat caused by the friction on the surface of contact 17 between the movable sealing rings 9' and the fixed sealing rings 9, and it is in turn cooled by the liquid in the coil. As shown, the lubricant also surrounds the indented portion of the container. The container 3 may advantageously be provided with a manifold 18 by which it is connected to a means capable of keeping a pressure in the container similar to that prevailing in the enclosure 2.

Naturally, the invention is not limited to the embodiment which has been described and represented for the sake of example, and variations and modifications are possible within the scope of the invention as defined in the appended claims.

I claim:

1. A sealing and guiding device for a shaft driven in rotation and adapted to operate in an enclosure under a pressure different from ambient atmospheric pressure, said device comprising a container contiguous to the enclosure, said shaft extending through said container and into the enclosure, a sheath surrounding said shaft and extending along the entire length thereof in said container, the portion of said shaft in said container having a uniform outer diameter and the sheath having a corresponding uniform inner diameter, said container including an indented portion defining a clearance with said shaft, bearing means supported in said indented portion of the container between said sheath and container for supporting and guiding said shaft, sealing means in said container for sealing the shaft at locations where the shaft exits from the bearing means and enters the interior of the container, and exits from the container and enters the enclosure, said sealing means comprising rigid sealing members at each location, a lubricant filling said container and extending around the indented portion and the bearing means, means for cooling said lubricant, and an inlet for introduction into said container of a fluid at a pressure similar to that prevailing in the enclosure.

2. A device as claimed in claim 1 wherein the cooling means comprises a hollow coil in said container surrounding said shaft and having an inlet and an outlet for passage through the coil of a cooling fluid, blades secured to said sheath for circulating the lubricant in the container and a cylindrical screen around said sheath between the blades and the coil.

3. A device as claimed in claim 2 wherein said sealing members are arranged in pairs at said two locations, one sealing member of each pair being coupled to said sheath for rotation therewith, the other sealing member being fixed, and an O-ring between each rotatable sealing member and said sheath and between each fixed sealing member and the respective associated enclosure and container, and spring means acting on said rotatable sealing members to urge the same against their respective fixed sealing members.

References Cited
UNITED STATES PATENTS

| | | | |
|---|---|---|---|
| 3,489,419 | 1/1970 | Stratienko | 277—22 X |
| 3,526,469 | 9/1970 | Lipe et al. | 277—62 X |
| 2,799,522 | 7/1957 | King et al. | 277—22 X |
| 2,836,440 | 5/1958 | Brumagim | 277—62 |
| 2,494,887 | 1/1950 | Lenhart | 277—22 |

SAMUEL ROTHBERG, Primary Examiner

U.S. Cl. X.R.

277—62; 308—36.2